United States Patent
McDowell (10) Patent No.: US 7,530,092 B2
(45) Date of Patent: *May 5, 2009

(54) METHOD OF PRIORITIZING ENTRIES WITHIN A SERVICE GROUP MAP TO FACILITATE AUTO CHANNEL DISCOVERY

(75) Inventor: Ronald W. McDowell, Suwanee, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 948 days.

This patent is subject to a terminal disclaimer.

(21) Appl. No.: 10/838,749

(22) Filed: May 4, 2004

(65) Prior Publication Data

US 2005/0251837 A1 Nov. 10, 2005

(51) Int. Cl.
*H04N 7/173* (2006.01)
(52) U.S. Cl. ...................................... 725/118
(58) Field of Classification Search ................ 725/118, 725/105
See application file for complete search history.

(56) References Cited

U.S. PATENT DOCUMENTS

| 5,953,051 A | 9/1999 | Fielding et al. |
| 7,246,366 B1 | 7/2007 | Addington et al. |
| 2003/0074670 A1* | 4/2003 | Penk et al. ............... 725/96 |

FOREIGN PATENT DOCUMENTS

| EP | 1 267 579 | 12/2002 |
| WO | WO01/97507 | 12/2001 |
| WO | WO 2005/022892 A2 | 3/2005 |

OTHER PUBLICATIONS

Introduction to Algorthms, Cormen et al., 141, lines 17-22—Fig 7.1 142, line 26—p. 145,fig 7.3 149, lines 10-28.
Cormen T.; Leiserson C; Rivest R. "Introduction to Algorithms: Ch. 5-Sets, etc" 1992, The MIT Press, London, England, XP002336858 pp. 77-98.
Knuth, D E, Sorting and Searching-The Art of Computer Programming. Passage Text Sorting and Serching, Art of Computer Programming, Reading, . . . vol. 3, 1998, pp. 406-419.
Introduction to Algorithms Sep. 1, 2001, Cormen et al., 141, lines 17-22—Fig 7.1 142, lines 26—p. 146,fig 7.3 149, lines 10-28.

* cited by examiner

Primary Examiner—Andrew Y Koenig
Assistant Examiner—James Leija
(74) Attorney, Agent, or Firm—Edell, Shapiro & Finnan, LLC (57) ABSTRACT

A system and method for minimizing timeouts when enhanced services are requested through a digital home communications terminal (DHCT) requiring discovery of a service group identification (SGID) assigned to the DHCT. A service group map (SGM) includes a plurality of entries. Each entry includes a frequency, a tabulated transport stream identification (TSID), and a SGID associated with one another. The SGM has multiple occurrences of the same frequency. Each of the entries are prioritized relative one another such that the frequencies associated with first occurrences of each SGID have the highest priority.

23 Claims, 7 Drawing Sheets

| Service Group Map File ||| |
|---|---|---|---|
| Freq | TSID | SGID | 400 |
| 537 | 1502 | 74 | ⎫ |
| 543 | 1702 | 75 | ⎬ 410 |
| 543 | 2102 | 77 | |
| 705 | 1902 | 76 | ⎭ |
| 543 | 1508 | 74 | ⎫ |
| 549 | 1708 | 75 | ⎬ 420 |
| 549 | 2108 | 77 | |
| 711 | 1908 | 76 | ⎭ |
| 549 | 1515 | 74 | ⎫ |
| 555 | 1715 | 75 | ⎬ 430 |
| 717 | 1915 | 76 | ⎭ |
| ⋮ | ⋮ | ⋮ | |

Fig. 1
(Prior Art)

| Service Group Map File | | | |
|---|---|---|---|
| Freq | TSID | SGID | |
| 699 | 1921 | 76 | |
| 603 | 1915 | 76 | |
| 549 | 1908 | 76 | |
| 543 | 1902 | 76 | |
| 699 | 1721 | 75 | |
| 603 | 1715 | 75 | |
| 549 | 1708 | 75 | |
| 543 | 1702 | 75 | |
| 699 | 1521 | 74 | |
| 603 | 1515 | 74 | |
| 549 | 1508 | 74 | |
| 543 | 1502 | 74 | |

| Service Group Map File | | |
|---|---|---|
| Freq | TSID | SGID |
| 543 | 1902 | 76 |
| 543 | 1702 | 75 |
| 543 | 1502 | 74 |
| ⋮ | ⋮ | ⋮ |
| 549 | 1908 | 76 |
| 549 | 1708 | 75 |
| 549 | 1508 | 74 |
| ⋮ | ⋮ | ⋮ |
| 603 | 1915 | 76 |
| 603 | 1715 | 75 |
| 603 | 1515 | 74 |
| ⋮ | ⋮ | ⋮ |

| Service Group Map File | | |
|---|---|---|
| Freq | TSID | SGID |
| 537 | 1502 | 74 |
| 543 | 1702 | 75 |
| 543 | 2102 | 77 |
| 705 | 1902 | 76 |
| 543 | 1508 | 74 |
| 549 | 1708 | 75 |
| 549 | 2108 | 77 |
| 711 | 1908 | 76 |
| 549 | 1515 | 74 |
| 555 | 1715 | 75 |
| 717 | 1915 | 76 |
| ... | ... | ... |

| Service Group Map File | | |
|---|---|---|
| Freq | TSID | SGID |
| 537 | 1512 | 74 |
| 537 | 1514 | 75 |
| 537 | 1516 | 76 |
| 543 | 1612 | 74 |
| 543 | 1614 | 75 |
| 543 | 1616 | 77 |
| 549 | 1712 | 76 |
| ... | ... | ... |

Fig. 7

| Service Group Map File | | |
|---|---|---|
| Freq | TSID | SGID |
| 531 | 1502 | 74 |
| 537 | 1508 | 74 |
| 543 | 1515 | 74 |
| 549 | 1522 | 74 |
| 603 | 1530 | 74 |
| 543 | 1702 | 75 |
| 549 | 1708 | 75 |
| 603 | 1715 | 75 |
| 699 | 1722 | 75 |
| 705 | 1730 | 75 |
| 531 | 1902 | 76 |
| 537 | 1908 | 76 |
| 543 | 1915 | 76 |
| 549 | 1922 | 76 |
| 603 | 1930 | 76 |
| 543 | 2102 | 77 |
| 549 | 2108 | 77 |
| 603 | 2115 | 77 |
| 699 | 2122 | 77 |
| 705 | 2130 | 77 |
| 531 | 2302 | 78 |
| 537 | 2308 | 78 |
| 543 | 2315 | 78 |
| 549 | 2322 | 78 |
| 603 | 2330 | 78 |

Fig. 8

| Service Group Map File | | |
|---|---|---|
| Freq | TSID | SGID |
| 543 | 1502 | 74 |
| 543 | 1702 | 75 |
| 543 | 1902 | 76 |
| 543 | 2102 | 77 |
| 543 | 2302 | 78 |
| 543 | 2502 | 79 |
| 543 | 2702 | 80 |
| 549 | 1508 | 74 |
| 549 | 1708 | 75 |
| 549 | 1908 | 76 |
| 549 | 2108 | 77 |
| 549 | 2308 | 78 |
| 549 | 2508 | 79 |
| 549 | 2708 | 80 |
| 603 | 1515 | 74 |
| 603 | 1715 | 75 |
| 603 | 1915 | 76 |
| 603 | 2115 | 77 |
| 603 | 2315 | 78 |
| 603 | 2515 | 79 |
| 603 | 2715 | 80 |
| 699 | 1522 | 74 |
| 699 | 1722 | 75 |
| 699 | 1922 | 76 |
| 699 | 2122 | 77 |
| 699 | 2322 | 78 |
| 699 | 2522 | 79 |
| 699 | 2722 | 80 |
| 705 | 1530 | 74 |
| 705 | 1730 | 75 |
| 705 | 1930 | 76 |
| 705 | 2130 | 77 |
| 705 | 2330 | 78 |
| 705 | 2530 | 79 |
| 705 | 2730 | 80 |

Fig. 9

METHOD OF PRIORITIZING ENTRIES WITHIN A SERVICE GROUP MAP TO FACILITATE AUTO CHANNEL DISCOVERY

CROSS REFERENCE TO RELATED APPLICATIONS

The present application is related to U.S. nonprovisional application Ser. No. 10/838,637 entitled "METHOD FOR QUICKLY IDENTIFYING NETWORK SESSION RESOURCES" and to nonprovisional application Ser. No. 10/838,541 entitled "METHOD OF SEARCHING ORDERED ENTRIES IN A SERVICE GROUP MAP TO FACILITATE AUTO CHANNEL DISCOVERY", which are incorporated herein by reference, and having been filed concurrently with the present application.

TECHNICAL FIELD

The present invention relates to network topology within digital transmission systems, and more particularly to expediting the discovery of network resources by optimizing timeout occurrences.

BACKGROUND OF THE INVENTION

Current digital transmission systems were originally designed to support hierarchical interactive services such as video-on-demand (VOD) systems. For example, a hierarchical VOD system would include multiple tiers of quadrature amplitude modulation (QAM) modulators with corresponding VOD servers where the tiers defined a pyramid-like hierarchical network structure. It was thought less frequently view content would be stored at a higher level tier on a larger QAM where then the most popular content would be pushed out to the lower tier or bottom edge of the network. However, as shown in FIG. 1, some networks today are actually flat and not hierarchical because of the lack of content and the increasing size of disk drives.

Figure 1:
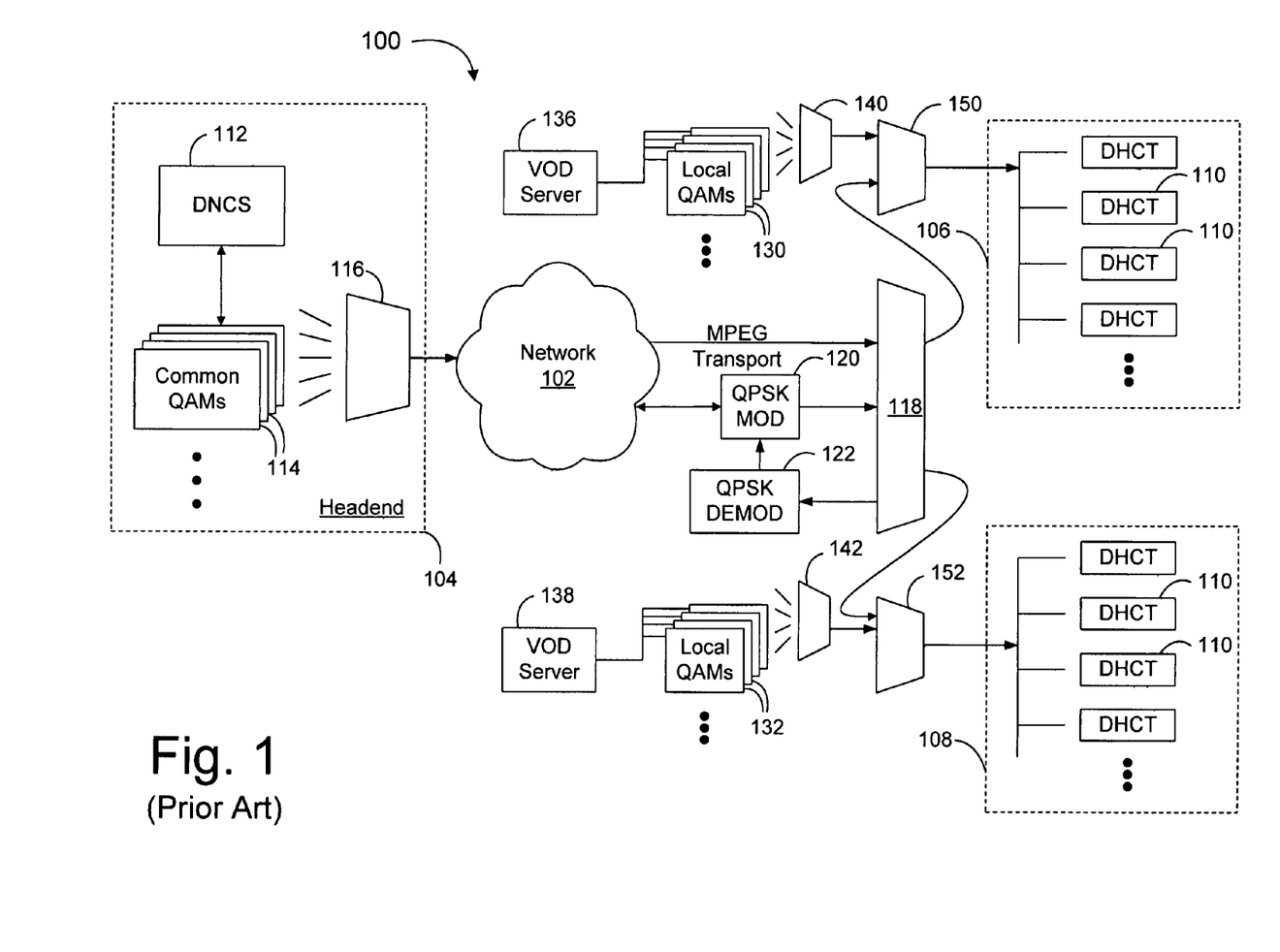
FIG. 1 illustrates one embodiment of a broadband communications system in which the present invention may be deployed.

FIG. 1 depicts a typical flat subscriber television system (STS) 100 that includes a network 102, headend 104, and service groups 106, 108. The STS 100 can be configured differently and, in particular, can include any number of service groups such as service groups 106, 108. Each service group 106, 108 includes a plurality of digital home communication terminals (DHCTs) 110 such as those commonly referred to as set-top boxes.

The headend 104 provides the interface between DHCTs 110 and service and content providers (not shown) such as broadcasters, internet service providers, and the like. Information about the network 102 is controlled by a digital network controller system (DNCS) 112 within the headend 104. The headend 104 also includes a plurality of common QAMs 114 that receive digital bit streams. The QAMS 114 modulate the bit streams for transmission over the network 102. A combiner 116 combines modulated sessions and outputs them to the plurality of DHCTs 110 across the network 102.

In one typical embodiment, the output signals from the network 102 are an in-band MPEG transport stream and a two-way out-of-band data stream received by a combiner 118. The out-of-band data stream is transmitted by a Quadrature Phase-Shift Keying (QPSK) modem array including a modulator 120 and a demodulator 122. Combiners 140, 142 combine the sessions from the locals QAMs 130, 132, respectively, where the combiners 150, 152 then cooperate with the combiner 118 to output the modulated sessions downstream to the DHCTs 110 of the services groups 106, 108.

A network system operator enters data into the DNCS 112 about the layout of the network 102 which includes transport stream identifications (TSIDs) and their associated service groups. Each service group 106, 108 is a plurality of DHCTs 110 that has access to the same multiplex of local QAMs 130, 132, respectively. Each service group 106, 108 has a unique service group identification (SGID). The DNCS 112 takes this data and produces two files based upon the broadcast file system (BFS) format. One file goes to the servers with enhanced services, such as VOD servers 136, 138 and the other goes to each of the DHCTs 110. The file to the DHCT 110 includes unique frequency entries that describe a single QAM in a single service group. There is an entry for each QAM in all service groups.

A subscriber using a DHCT 110 can receive exclusive sessions such as enhanced services by requesting them through the DHCT 110. The DHCT 110 looks for its service group among the many different service groups on the network 102. The process by which a DHCT 110 determines its service group is called auto-discovery. This process is generally a comparison of acquired data from the network 102 to tabulated reference data that provided to the DHCT 110. Once a match between the acquired data and the tabulated data is found, the identification of the service group is provided from the tabulated data. The SGID is then sent in the exclusive session request so that the server, such as the VOD server, can send the requested content through the appropriate QAMS.

Figure 2:
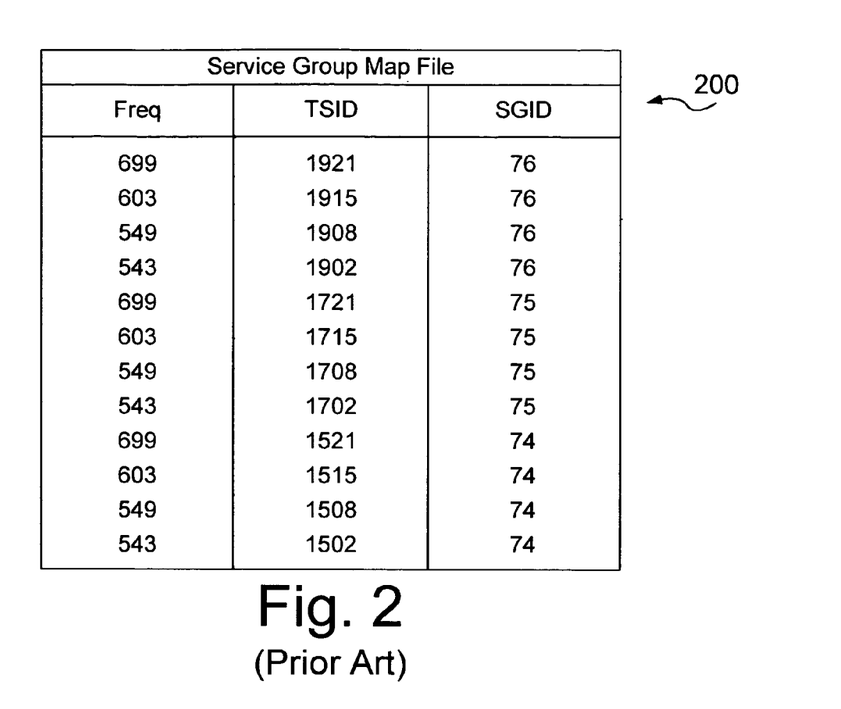
FIGS. 2 and 3 illustrate service group maps (SGMs) having data sorted according to prior art schemes.
Figure 3:
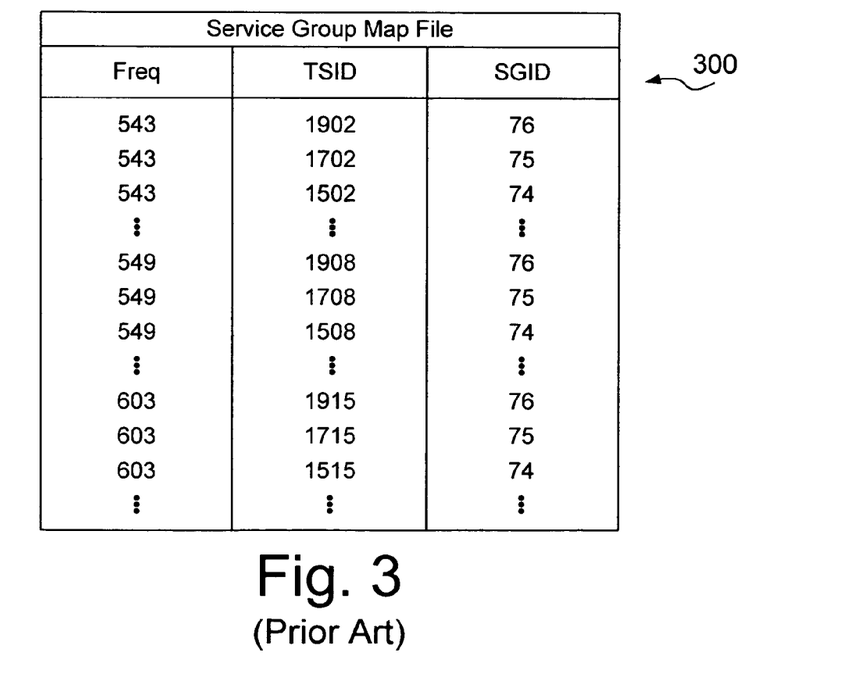

The reference data for the network 102 is commonly referred to as a service group map (SGM) containing three parameters: QAM frequency, the TSID, and the SGID. An example of a SGM 200 is shown in FIG. 2. The file is sorted by SGID and, therefore, all the frequencies for a particular SGID are grouped together before another group of frequencies is listed that is associated with a subsequent SGID. FIG. 3 illustrates an alternative example of a known SGM 300 that allows the DHCT 110 to make more efficient use of the tuner in the DHCT. As shown in FIG. 3, the DNCS 112 organizes the map file by grouping all entries of the same frequency together. Because the file is sorted by similar frequencies, each identical occurrence of a particular frequency corresponds with a different SGID. The number of TSIDs for a given frequency is typically large. In either of the SGMs 200 or 300, the map entries are searched sequentially.

On the other hand, the acquired data is the actual QAM frequencies the DHCT 110 has access to in the network 102 and the associated TSID, contained within the program association table (PAT), which uniquely identifies the QAM for a particular service group. A DHCT 110 discovers its SGID once the tabulated TSID from the SGM is matched with the corresponding acquired TSID from the PAT.

For example, upon purchase of a VOD movie, the DHCT 110 will empty its cache and begin looking for information in the SGM file one entry at a time. Referring to FIG. 2, the DHCT 110 attempts to tune the first frequency in the SGM 200 and locks onto the QAM to retrieve the acquired TSID from the PAT. The DHCT 110 compares the acquired TSID from the PAT to the tabulated TSID from the SGM 200. If they do not match, the DHCT 110 places the acquired TSID and its associated frequency in the cache and moves to the next entry in the SGM 200. The DHCT 110 attempts to tune to the next frequency and, if able to successfully lock onto the QAM, another acquired TSID is retrieved from the PAT. The DHCT 110 again compares this acquired TSID from the PAT to the tabulated TSID from the SGM 200 associated with the second frequency. If they still do not match, the DHCT 110 again places the acquired TSID and its associated frequency in the cache and moves onto the next entry in the SGM 200.

The DHCT 110 continues to go through the SGM 200 in this manner, acquiring TSIDs from the PAT and comparing them to the tabulated TSIDs in the SGM 200, until it reaches a frequency for which it already has information cached. When it reaches a frequency for which it has data cached, rather than tune to the same frequency again, it compares the acquired TSID in cache to the tabulated TSID in the current entry of the SGM 200. The DHCT 110 would continue to go through the SGM 200 in this manner, comparing acquired TSIDs to the tabulated TSID in the SGM 200, until the DHCT 110 reaches the first entry in the SGM 200 for its still unbeknownst service group. Still referring to FIG. 2, if the DHCT 110's SGID was 74, the DHCT 110 would have to go through every entry for SGID 76, as well as every entry for SGID 75, before coming to the first occurrence of a frequency associated with SGID 74 of the DHCT 110. In such case, the DHCT 110 retrieves from cache the acquired TSID associated with the first frequency in the DHCT 110's still unbeknownst service group. The DHCT 110 compares the cached acquired TSID to the tabulated TSID from the SGM 200 and finds there is a match. The DHCT 110 then retrieves the SGID associated with the matching TSIDs from the SGM 200. The DHCT 110 has then discovered its SGID which is SGID 74.

The SGM 300 of FIG. 3 is merely provided to depict entries for the same frequency grouped together. If all frequencies were to be available to the entire population of DHCTs 110 within the STS 100, the map would be as shown to include an occurrence of each SGID grouped together for the same frequency. Where all the entries of the same frequency are grouped together, the tuner is not required to repeatedly tune to each subsequent occurrence of the same frequency. This makes more efficient use of the tuner. The DHCT 110 simply compares the cached acquired TSID with each of the tabulated TSIDs grouped together, one after the other, associated with the tuned frequency to determine if there is a match. If there is no match within a particular frequency, the next frequency is tuned for the next group of tabulated TSIDs. Once the tabulated TSID and the acquired TSID match, the DHCT 110 retrieves the SGID from the SGM 300. The DHCT 110 has then discovered its SGID utilizing this alternative SGM 300.

However, if all of the frequencies are not available to the entire population of DHCTs, the DHCT 110 may experience delays on occasion. For example, the DHCT 110 will not always be successful when attempting to lock onto a QAM. The DHCT 110 is allowed a period of time to tune a particular channel to find its service group. This period of time when the DHCT 110 is unsuccessful in its attempt to tune is commonly referred to as a timeout. Timeouts are undesirable because timeouts result in delays in providing enhanced service to the subscriber. If the DHCT 110 tunes a channel where no digital signal is present, the search by the DHCT 110 results in a timeout before being able to tune another channel. Even if the SGM 300 is sorted by frequency, as in FIG. 3, the DHCT 110 could easily timeout numerous times before tuning to a frequency from which the DHCT receives a digital signal.

These known SGMs 200 and 300, one which groups the information according to particular service groups and the other which groups all the entries of the same frequencies, are not the most effective way of presenting data to the DHCT 110 for processing. These known SGMs 200 and 300 are inefficient because the DHCT 110 may endure multiple timeouts. What is needed is an improved system and method for expediting the discovery of the correct SGID by the DHCT 110. The improved system and method must minimize the number of channels tuned as well as minimize the number of timeouts, resulting in improved performance of the auto-discovery process.

DETAILED DESCRIPTION

The present invention will be described more fully hereinafter with reference to the accompanying drawings in which like numerals represent like elements throughout the several figures, and in which exemplary embodiments of the invention are shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

The present invention may be implemented in the context of a subscriber television system (STS) 100 as hardware, software, firmware, or a combination thereof. An STS 100 may be configured in many different ways, but generally includes a network 102 interposed between a headend 104 and a plurality of digital subscriber communication terminal (DSCTs) 110. The DSCT 110 located at a subscriber's premises provides an interface between the headend 104 and the subscriber. The headend 104 receives and processes programming signals from content providers. The STS 100 may include additional components or include systems that forgo utilizing physical structured cabling for transmission such as satellite systems.

In one embodiment of the present invention, a subscriber using a DHCT 110 can receive exclusive sessions such as enhanced services by requesting them through the DHCT 110. The DHCT 110 looks for its service group among the many different service groups, such as service groups 106, 108, on the network 102 by implementing an improved auto-discovery system and method for expediting the discovery of the correct service group identification (SGID) by the DHCT 110. The improved auto-discovery system and method minimizes the number of channels tuned as well as minimizes the number of timeouts, resulting in improved performance of the auto-discovery process.

Figure 4:
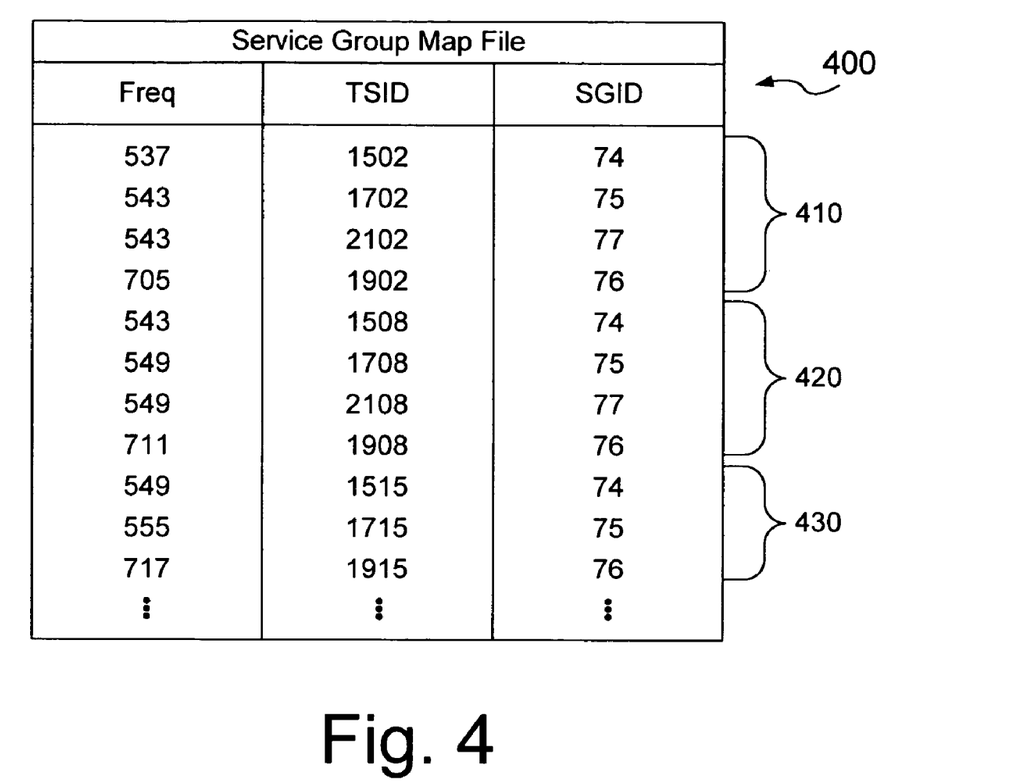
FIG. 4 illustrates one embodiment of a SGM for implementing the present invention.

A service group map (SGM) 400, as shown in FIG. 4, depicts a more efficient way of presenting reference data to the DHCT 110 for minimizing timeouts. Each entry of tabulated data of SGM 400 includes the three associated parameters: QAM frequency, tabulated TSID, and SGID. The tabulated TSID in any one entry of SGM 400 is distinguishable from every other tabulated TSID in any other entry of the SGM 400.

However, the entries within SGM 400 are arranged differently than the entries of either SGM 200 or SGM 300. In particular, the entries of the SGM 400 are arranged so that first occurrences of each different SGID are interspersed alternately in a group with one another. In FIG. 4, there are only four distinguishable SGIDs shown: 74, 75, 76, and 77. However, the SGM 400 includes multiple occurrences of the same frequency. Preferably, therefore, for this example, every $N^{th}$ occurrence of each SGID is grouped together in an interspersed alternately manner relative one another. Also, it is within the scope of the present invention to include any number of different SGIDs even though only four distinguishable SGIDs are used in FIG. 4.

As shown in FIG. 4, the first occurrences of each of the SGIDs 74, 75, 76 and 77 are grouped together as shown by the reference number 410. The second occurrences of each of the SGIDs 74, 75, 76 and 77 are grouped together as shown by the reference number 420. The third occurrences of each of the SGIDs 74, 75, 76 and 77 are grouped together as shown by the reference number 430. The SGIDs of each group 410, 420 and 430 are interspersed alternately relative one another. Note, however, that any number of distinguishable SGIDs may be included in the SGM 400 and that it is not required that the distinguishable SGIDs within each group be listed consecutively in numerical or ascending order. Moreover, the SGM 400 of FIG. 4 illustrates that not all frequencies are available to the entire population of DHCTs 110 within the STS 100.

Arranging the first occurrences of all the distinguishable SGIDs, together in a group, before or coincident with any other occurrence of any of the SGIDs expedites the auto-discovery process. A DHCT 110 discovers its SGID from the SGM 400 once the tabulated TSID from the SGM 400 is matched with the corresponding acquired TSID from the PAT stored within the cache of the DHCT 110 from the PAT.

Figure 5A:
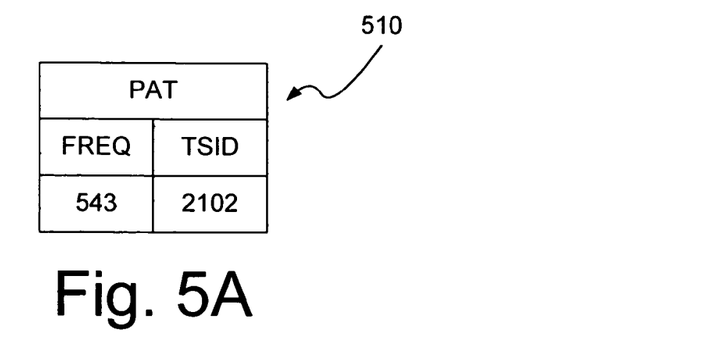
FIGS. 5A and 5B illustrate program association tables (PATs) having transport stream identifications (TSIDs) which uniquely identify a particular QAM for a particular service group.
Figure 5B:
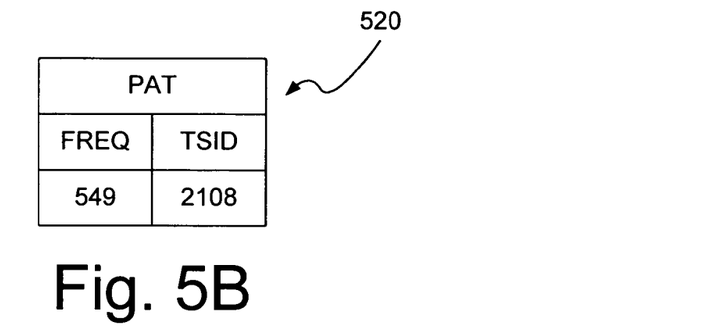

For example, upon purchase of a VOD movie, the DHCT 110, unknowingly assigned to SGID 77, will empty its cache and begin looking for information in the SGM 400 one entry at a time in order to discovery its SGID. FIGS. 5A and 5B depict PATs 510 and 520 having TSIDs which uniquely identify the QAMs on various frequencies for SGID 77 by providing the TSID for the specific said QAM frequency, to be acquired by the DHCT 110. Referring to the first entry in FIG. 4, the DHCT 110 attempts to tune the first frequency (537 MHz) in the SGM 400 and attempts to lock onto the QAM to acquire a TSID. Since, in this example, the DHCT is not able to lock onto a QAM with a frequency of 537 MHz, the DHCT times out and moves to the second entry (543 MHz) in the SGM 400.

The DHCT 110 attempts to tune to the next frequency and, since the DHCT 110 is now able to successfully lock onto the QAM, an acquired TSID is retrieved from the PAT 510 in FIG. 5A. The DHCT 110 compares this acquired TSID from the PAT 510 to the tabulated TSID from the SGM 400 associated with the second frequency. Because they do not match, the DHCT 110 places the acquired TSID and its associated frequency in the cache 600 as shown in FIG. 6 and moves onto the third entry (543 MHz) in the SGM 400.

Figure 6:
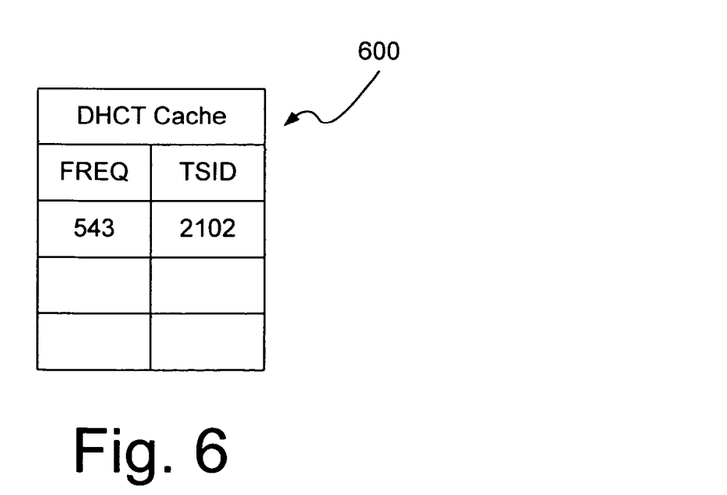
FIG. 6 illustrates one embodiment of a cache of a DHCT.

When moving to the third entry, the tuner has already tuned to this frequency (543 MHz) and, therefore, already has the TSID in cache as shown in FIG. 6. This cached TSID is then compared to the tabulated TSID from the SGM 400 associated with this frequency.

In this case, the cached TSID of 2102 and the tabulated TSID of 2102 match and no further data is necessary to be acquired. The DHCT 110 then retrieves the SGID, in this case the SGID of 77, associated with the matching TSIDs from the SGM 400. In the event that the DHCT 110 was not able to lock onto the QAM at 543 MHz, for example if the QAM was not operable at the time, the DHCT would then continue through the SGM 400. Upon encountering the first entry associated with 549 MHz in SGM 400 the DHCT would lock onto the QAM and retrieve a TSID from the PAT 520 in FIG. 5B and continue in the same manner as was employed with PAT 510 in FIG. 5A. The cache of the DHCT 110 will only accumulate a number of acquired TSIDs that is less than or equal to the number of SGIDs that are distinguishable from one another. The discovered SGID is then sent in the exclusive session request so the server, such as either of the VOD servers 136, 138, can send the requested content through the appropriate local QAMS.

Because the DHCT 110 only needs to identify one of its local QAMs, the particular SGID to which the DHCT 110 belongs can be quickly discovered without tuning to any frequency corresponding to any subsequent occurrence of any one of the SGIDs. Therefore, arranging the SGM such that the first occurrence of each distinguishable SGID is listed before a subsequent occurrence of any of the distinguishable SGIDs insures that the appropriate SGID will be found more quickly by tuning only to each frequency associated with the first occurrence of each distinguishable SGID and by eliminating tuning to frequencies corresponding to subsequent occurrences of any of the distinguishable SGIDs.

However, on occasion a local QAM intended to be available to a DHCT 110 may be down. In such case, an attempt to tune to the down local QAM will not be successful and the DHCT 110 will process through every first occurrence of the distinguishable SGIDs of the SGM 400 without finding a match. Therefore, in one embodiment, the SGM should also include subsequent occurrences of each distinguishable SGID grouped together in an interspersed alternating manner as shown in FIG. 4. For example, if the local QAM utilizing the frequency of 705 MHz in group 410 is down, the DHCT would then process the entries within group 420. The DHCT would process each entry in group 420 one after the other until coming to the entry corresponding to the service group of the particular DHCT 110. In the event another local QAM is down, the SGM 400 allows for any number of groups of SGIDS where the SGIDs within each group are interspersed alternately one another. Therefore, the DHCT 110 may forgo tuning any frequencies which correspond with any subsequent occurrence of any SGID unless an attempt to tune a frequency corresponding to any first occurrence of one of the SGIDs failed and another frequency corresponding with a subsequent occurrence of any of the SGIDs is needed for redundancy.

On occasion, it may be necessary to include an occurrence of one or more, but preferably not all, of the distinguishable SGIDs before or above an ordered group of SGIDs which are interspersed alternately relative one another. For example, if the SGM 400 of FIG. 400 is modified to include an additional entry above the group 410, than the first occurrence of each distinguishable would no longer be grouped together. In this situation, however, at least a portion of the entries, in this case the entries defined by either of the groups 410, 420 or 430, remain arranged relative to one another such that an occurrence of every SGID is interspersed alternately relative one another within its respective group.

Figure 7:
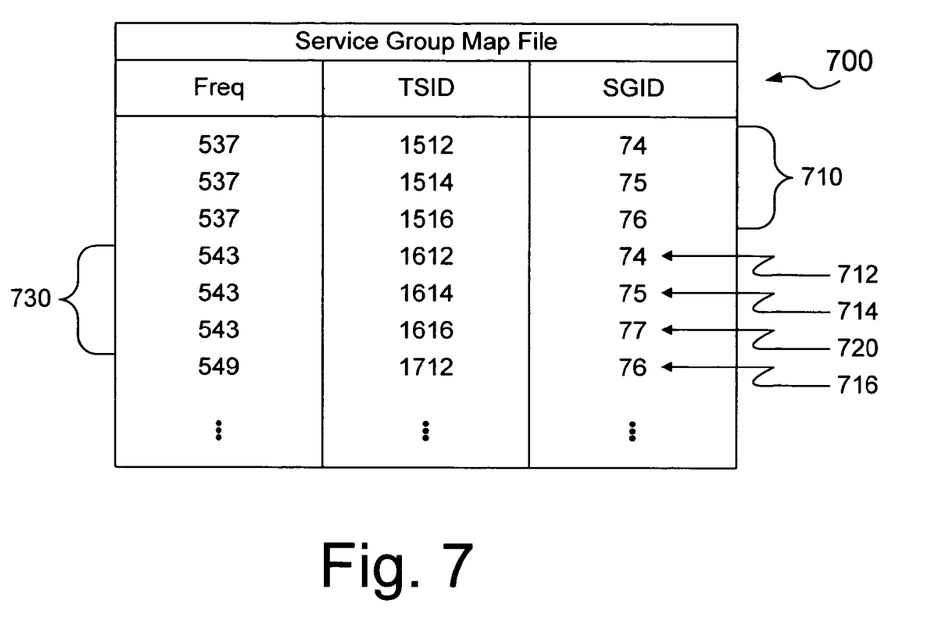
FIG. 7 illustrates another embodiment of a SGM for implementing the present invention.

Also, FIG. 7 illustrates that the first occurrences of SGIDs may be arranged before the second occurrences of each of the SGIDs, but that the first occurrence of at least one of the SGIDs may appear subsequent to second occurrences of the SGIDs. For example, the entries within the SGM 700 are grouped by frequency. The first occurrences of the SGIDs of 74, 75 and 76 appear at the beginning of the SGM 700 and are grouped by the reference number 710. In this example, the entries within group 710 utilize the frequency of 537 MHz. Second occurrences of the SGIDs of 74, 75 and 76 are entries 712, 714 and 716, respectively, which follow below the entries within the group 710. However, an entry 720, having an SGID of 77, is placed between entries 714 and 716. Entries 712, 714 and 720 utilize the frequency of 543 MHz and may together be referred to as group 730.

Because the entries are grouped based upon frequency, the entry 720 may be placed anywhere within the group 730 and, as shown in FIG. 7, the first occurrence of the SGID of 77 may not then be interspersed alternately relative the SGIDs of group 710. The first occurrences of the SGIDs of 74, 75 and 76 are before the subsequent occurrences of the SGIDs of 74, 75 and 76, which have the assigned frequency of 543 MHz, except that the first occurrence of the SGID of 77 follows the second occurrence SGIDs of 74 and 75 because the SGID of 77 is assigned the same frequency assigned to the SGIDs of 74 and 75.

Therefore, the entries of SGM 700 are arranged relative to one another such that the first occurrence of each SGID is before a subsequent occurrence of any of the SGIDs, except when one of the frequencies associated with the first occurrence of one of the SGIDs is the same as a subsequent occurrence of any other of the SGIDs. The SGID assigned to the DHCT 110 is discoverable prior to the DHCT 110 tuning to any frequency corresponding to any subsequent occurrence of any one of the SGIDs, except when tuning a frequency associated with the first occurrence of one of the SGIDs which is the same as the frequency associated with the subsequent occurrence of any other of the SGIDs. Moreover, the entries of SGM 700 are arranged relative to one another such that the Nth occurrence of each SGID is before a subsequent occurrence, or before a Nth+1 occurrence, of any of the SGIDs, except when one of the frequencies associated with the Nth occurrence of one of the SGIDs is the same as a subsequent or Nth+1 occurrence of any other of the SGIDs.

It may also be desirable to prioritize the entries within a SGM whether or not the SGIDs are interspersed alternately relative one another. Preferably, however, the entries are prioritized within a SGM when arranging the SGIDs that are distinguishable from one another in an interspersed alternating manner. For example, it may be desirable to prioritize based upon the lowest frequencies for which a TSID is available to the DHCTs, the highest frequencies which a TSID is available to the DHCTs, the number of subscribers associated with particular frequencies, the number of DHCTs associated with particular frequencies, the number of SGIDs associated with the frequency, etc. In such case, the first occurrence of each SGID distinguishable from one another would preferably have the highest priority. It is also possible to prioritize the frequencies of the SGM based upon the number of SGIDs associated with a particular one of the frequencies.

In FIG. 4, for example, the entries are prioritized based upon the lowest frequencies for which a TSID is available to each service group. In particular, the frequencies corresponding to SGID 74 in the first entry of group 410 is lower than the frequencies corresponding to SGID 74 in either of the groups 420 and 430. Also, each of the frequencies corresponding to a particular SGID within the group 410 is lower than any of the frequencies corresponding to the same particular SGID within either of the groups 420 and 430. Therefore, as shown in FIG. 4, the frequencies within the group 410 are lower than the frequencies of group 420 having the same SGID. Also, the frequencies within group 420 are lower than the frequencies with group 430 having the same SGID. Accordingly, any subsequent group of frequencies would be higher than the frequencies of the groups 410, 420 and 430 based upon the same SGID.

According to another embodiment of the present invention, it is possible to prioritize based on other than the lowest frequencies for which a TSID is available. For example, the SGM 400 could instead be prioritized by having the first occurrence of each distinguishable SGID correspond to the highest frequencies for which a TSID is available. In such case, of the three groups shown in the embodiment of FIG. 4, the entries of group 430 would be at the top of the SGM 400, followed by the entries of group 420, and then the entries of group 420 are followed by the entries of group 410.

As mentioned above, the list of TSIDs for a given frequency is expected to be large. Processing the list of an SGM can be costly with regard to time. In one embodiment of the present invention, in order to optimize the search through a SGM, the list should be ordered and the number of entries should be listed along with the frequency to facilitate determining the middle of the list. Processing should then preferably begin in the middle of the list.

If a match is not immediately obtained, then a decision about the match being in the first half or second half, or another portion, of the list can be made. Recursively parsing even smaller portions of the list can process numerous entries in only a few comparisons. Preferably, the optimal file format for processing on the DHCT 110 is a binary file where the list of TSIDs is composed of a balanced binary tree as discussed below.

Using a binary tree for lists of the TSIDs and the SGIDs has the effect that as the number of service groups (N) grow, the processing time increases exponentially. This is in contrast to known systems where the effort increases linearly with N. When dealing with very large files, the memory requirement of the DHCT is a concern and, therefore, there is no benefit from a cache file. This is because each frequency is dealt with independently. In addition, the binary tree can be broken up into multiple ports allowing each one to be processed independently if memory becomes an issue. Alternatively, the binary tree structure associated with each frequency can be listed in a separate file.

Figure 8:
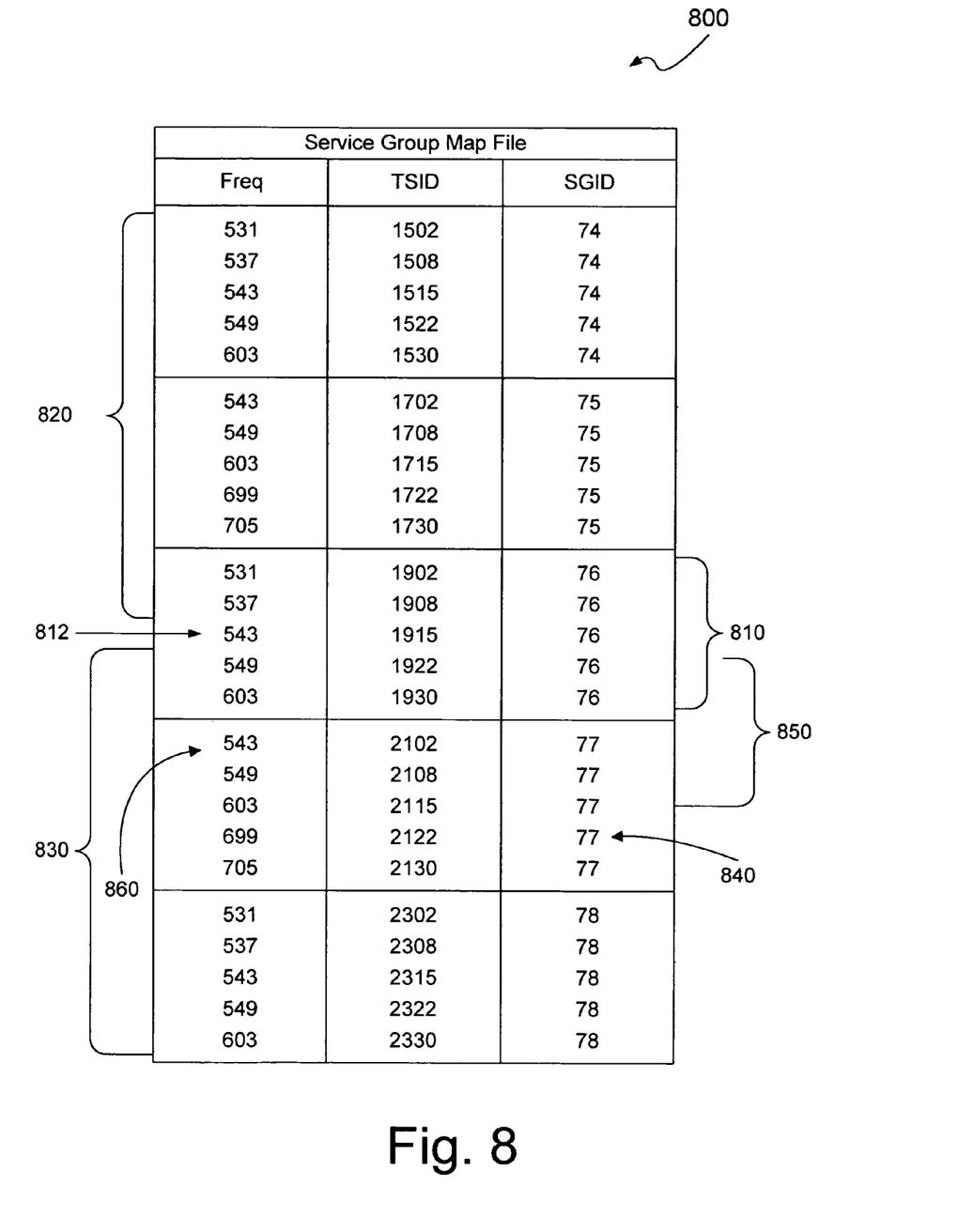
FIG. 8 illustrates yet another embodiment of a SGM for implementing the present invention.

FIG. 8 illustrates a SGM 800 adapted to enhance the auto discovery process by utilizing a binary search method. The SGM 800 may include any number of entries. As shown in FIG. 8, the data within the SGM 800 is organized in a particular order and, therefore, is capable of being searched utilizing a binary search method rather than searching the entries sequentially, first to last, such as when the data is not in any particular order. In particular, the tabulated TSIDs in FIG. 8 are arranged in numerical order. Preferably, the TSIDs are arranged in ascending order where the lowest numerical TSID is first and the highest numerical TSID is last. However, the TSIDs may be arranged differently relative one another so long as the direction of one tabulated TSID may be determined when the location of at least one other tabulated TSID is known. In such case, the TSIDs may be referred to as being balanced.

If not all, at least a portion of the entries in a SGM such as SGM 800 should be arranged relative one another so that the corresponding tabulated TSIDs are ordered. In FIG. 8, however, the entire list of tabulated TSIDs is arranged in ascending order and, therefore, the search should begin in the middle of SGM 800. In this case, the search should begin in the middle of group 810 which is entry 812. Because the searching commences in the middle of the ordered group of entries, the SGM is searched in other than a sequential manner. The ordered entries will be repeatedly divided in half until the matching TSIDs are located as explained below.

Referring to entry 812 in FIG. 8, the DHCT 110 attempts to tune to 543 MHz in the SGM 800 and locks onto the QAM to retrieve the acquired TSID from the PAT 510. The tabulated TSID within entry 812 is 1915. The DHCT 110 compares the acquired TSID from the PAT 510 to the tabulated TSID from the SGM 800. In this case, for example, assume that the acquired TSID from the PAT 510 is 2102 and, therefore, the tabulated and the acquired TSIDs do not match.

The entries above the entry 812 are the upper or first half 820 of the SGM 800 and the entries below the entry 812 are the lower or second half 830 of the SGM 800. Because the numerical value of the acquired TSID is known and the TSIDs within the arranged portion of the SGM 800 are ordered, it can be determined whether the tabulated TSID which will match the acquired TSID is above or below entry 812. In this case, the acquired TSID is below the entry 812 because the tabulated TSID of entry 812 is less than the acquired TSID from the PAT.

The middle of the lower half 830 is entry 840. Entry 840 has a tabulated TSID of 2122 which is higher than the acquired TSID. Therefore, the matching tabulated TSID must be between entry 840 and entry 812. The group of entries between entry 840 and entry 812 is identified in FIG. 8 by reference number 850. The middle entry in group 850 is entry 860 which has a tabulated TSID of 2102 which matches the acquired TSID. The DHCT 110 then retrieves from entry 860 the SGID associated with the matching TSIDs from the SGM 800. The discovered SGID, in this case the SGID of 77, is then sent in the exclusive session request so the server can send the requested content through the appropriate local QAMS.

Figure 9:
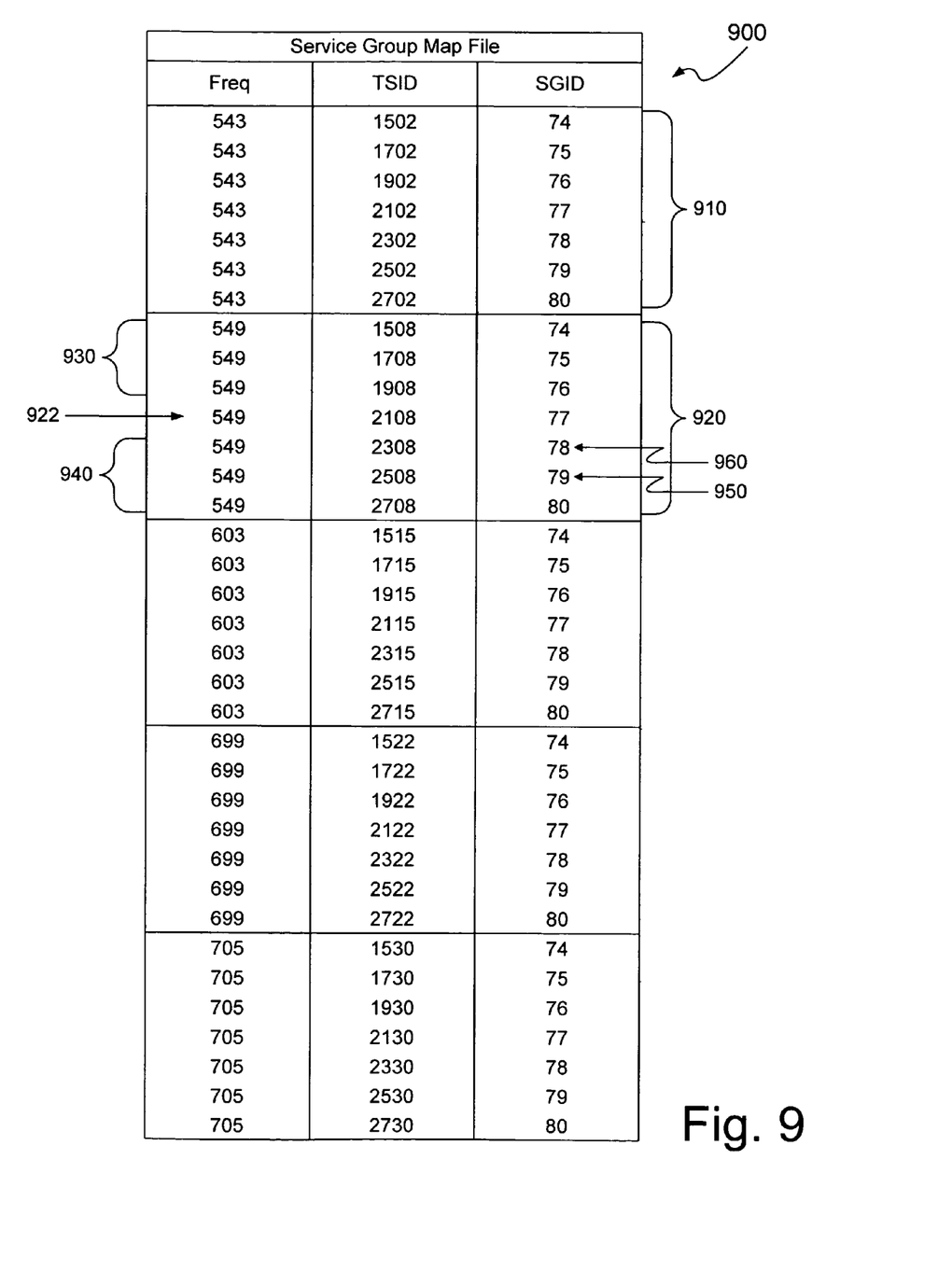
FIG. 9 illustrates still yet another embodiment of a SGM for implementing the present invention.

FIG. 9 illustrates another embodiment of a SGM 900 of the present invention that is also adapted to enhance the auto discovery process by utilizing a binary search method. The SGM 900 may also include any number of entries. As shown in FIG. 9, however, only portions of the entries are arranged relative one another so that the corresponding tabulated TSIDs are ordered. Particular occurrences of each SGID are grouped together. For example, the first occurrences of each of the SGIDs are in group 910 and the second occurrences of each SGID are in group 920. Each group of arranged entries may be searched separately. Note, however, any portion of arranged entries may be searched whether or not the entries are grouped based on any particular occurrences of SGIDs. Also, it is assumed in FIG. 9 that all frequencies are available to the entire population of DHCTs 110 and, therefore, the SGIDs inadvertently appear to be sorted by frequency.

The tabulated TSIDs within each group such as group 920 are preferably in ascending numerical order. Searching of the entries should begin in the middle of the ordered entries of a particular group. The number of occurrences of a particular frequency may be useful in distinguishing between various groups of ordered entries and, therefore, may be utilized in determining which group to begin searching in. As explained above, it is preferable to have the first occurrence of each of the SGIDs grouped together in an interspersed alternating manner at the top of the SGM. Otherwise, it is preferable to search the longest ordered group first and then search each of the next longest groups if needed.

However, assume that group 920 is selected for searching and the searching begins with entry 922 which is in the middle of group 920. The DHCT 110 tunes to 549 MHz and locks onto the QAM to retrieve the acquired TSID from the PAT 500. The tabulated TSID within entry 922 is 2108. The DHCT 110 compares the acquired TSID from the PAT 500 to the tabulated TSID of entry 922 from the SGM 900. In this case, for example, assume that the acquired TSID from the PAT 500 is 2308 and, therefore, the tabulated and the acquired TSIDs do not match.

The entries above the entry 922, within group 920, are the upper or first half 930 and the entries below the entry 922, within group 920, are the lower or second half 940. Because the numerical value of the acquired TSID is known and the TSIDs within the arranged entries of group 920 of the SGM 900 are ordered, it can be determined whether the tabulated TSID which matches the acquired TSID is above or below entry 922. In this case, the acquired TSID from the PAT is below entry 922 because the tabulated TSID of entry 2108 is less than the acquired TSID.

The middle of the lower half 940 is entry 950. Entry 950 has a tabulated TSID of 2508 which is a higher numerical value than the acquired TSID. Therefore, the matching tabulated TSID must be between entry 922 and entry 950 within group 920. In this case, there is only one entry between entry 922 and entry 950. Entry 960 has a tabulated TSID of 2308 which matches the acquired TSID. The DHCT 110 then retrieves from entry 960 the SGID associated with the matching TSIDs from the SGM 900. The discovered SGID, in this case the SGID of 78, is then sent in the exclusive session request so the server can send the requested content through the appropriate local QAMS.

However, if group 920 did not include an entry which has a tabulated TSID that matched the acquired TSID, such as when a particular frequency is not available or when on occasion a local QAM intended to be available is down, another group of ordered entries would be located and then searched. Preferably, groups having at least one occurrence of each SGID are searched first because the DHCT 110 only needs to identify one of its local QAMs as explained above. For example, in the previous example, the SGID will always be found because one occurrence of each of the SGIDs that are distinguishable from one another are interspersed alternately relative one another in a group. The particular SGID to which the DHCT 110 belongs can be quickly discovered without tuning to any other frequency corresponding to any subsequent occurrence of any one of the SGIDs.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method for creating an SGM, wherein said SGM is utilized by a DHCT, and wherein said DHCT requires discovery of a SGID assigned to said DHCT, said method comprising the steps of:

providing a plurality of entries, each said entry comprising a frequency, a tabulated TSID, and a SGID associated with one another, and said SGM having one or more occurrences of the same said frequencies; and prioritizing each of said entries adjacent to one another such that said frequencies associated with first occurrences of each said SGID have the highest priority, such that all identical frequencies in said SGM are not grouped together and such that all identical SGIDs in said SGM are not grouped together.

2. The method of claim 1 wherein said first occurrences of each said SGID are distinguishable from one another.

3. The method of claim 1 wherein said prioritizing step is performed by basing said priority on other than the lowest said frequency associated with each said SGID.

4. The method of claim 1 wherein said prioritizing step is performed by basing said priority on other than the highest said frequency associated with each said SGID.

5. The method of claim 1 wherein said prioritizing step is performed by basing said priority on other than the number of subscribers associated with each said frequency.

6. The method of claim 1 wherein said prioritizing step is performed by basing said priority on other than the number of DHCTs associated with each said frequency.

7. The method of claim 1 further comprising the step of prioritizing said frequencies of said SGM based upon said frequencies associated with said first occurrences of said SGID being the lowest for which said TSIDs are available to said DHCT.

8. The method of claim 1 further comprising the step of prioritizing said frequencies of said SGM based upon said frequencies associated with said first occurrences of said SGID being the highest for which said TSIDs are available to said DHCT.

9. The method of claim 1 further comprising the step of prioritizing said frequencies of said SGM based upon the number of subscribers associated with said frequencies associated with said first occurrences of said SGID.

10. The method of claim 1 further comprising the step of prioritizing said frequencies of said SGM based upon the number of DHCTs associated with said frequencies associated with said first occurrences of said SGID.

11. The method of claim 1 wherein said entries are arranged relative to one another such that first occurrences of each said SGID are interspersed alternately with one another.

12. The method of claim 1 wherein said entries are arranged relative to one another such that said first occurrence of each said SGID is before a subsequent occurrence of any of said SGIDs except when one of said frequencies associated with said first occurrence of one of said SGIDs is the same as a subsequent occurrence of any other of said SGIDs.

13. A cable system having a headend, the headend configured to provide an SGM to a DHCT, wherein the cable system comprises:
 a DHCT, wherein a SGM is utilized by said DHCT, and wherein said DHCT requires discovery of a SGID assigned to said DHCT, and
 wherein said SGM comprises:
  a plurality of entries, each said entry comprising a frequency, a tabulated TSID, and a SGID associated with one another, said SGM having one or more occurrences of the same said frequencies, and said entries arranged adjacent to one another based upon priority such that said frequencies associated with first occurrences of each said SGID have the highest priority, such that all identical frequencies in said SGM are not grouped together and such that all identical SGIDs in said SGM are not grouped together.

14. The SGM of claim 13 wherein said first occurrences of each said SGID are interspersed alternately with one another.

15. The SGM of claim 13 wherein said entries are arranged such that said frequencies corresponding with said first occurrences of said SGIDs represent the lowest frequencies for which said TSIDs are available to said DHCT.

16. The SGM of claim 15 wherein the frequencies corresponding with second occurrences of said SGIDs represent the second lowest frequencies for which said TSIDs are available to said DHCT.

17. The SGM of claim 13 wherein said entries are arranged such that said frequencies corresponding with said first occurrences of said SGIDs represent the highest frequencies for which said TSIDs are available to said DHCT.

18. The SGM of claim 17 wherein said entries are arranged such that said frequencies corresponding with second occurrences of said SGIDs represent the second highest frequencies for which said TSIDs are available to said DHCT.

19. The SGM of claim 13 wherein said entries are arranged such that said frequencies associated with the highest number of subscribers correspond with said first occurrences of each of said SGIDs.

20. The SGM of claim 19 wherein said entries are arranged such that said frequencies associated with the second highest number of subscribers correspond with second occurrences of each of said SGIDs.

21. The SGM of claim 13 wherein said entries are arranged such that said frequencies associated with the highest number of DHCTs correspond with said first occurrences of each of said SGIDs.

22. The SGM of claim 21 wherein said entries are arranged such that said frequencies associated with the second highest number of DHCTs correspond with second occurrences of each of said SGIDs.

23. The SGM of claim 13 wherein said entries are arranged relative to one another such that said first occurrence of each said SGID is before a subsequent occurrence of any of said SGIDs except when one of said frequencies associated with said first occurrence of one of said SGIDs is the same as a subsequent occurrence of any other of said SGIDs.

* * * * *